United States Patent
Geiger

(10) Patent No.: US 10,124,521 B2
(45) Date of Patent: Nov. 13, 2018

(54) TUBE AND TUBE BODY WITH AN ELECTRONIC DEVICE

(71) Applicant: Hoffmann Neopac AG, Thun (CH)

(72) Inventor: Andreas Geiger, Heimberg (CH)

(73) Assignee: HOFFMANN NEOPAC AG, Thun (CH)

( * ) Notice: Subject to any disclaimer, the term of this patent is extended or adjusted under 35 U.S.C. 154(b) by 0 days.

(21) Appl. No.: 15/710,039

(22) Filed: Sep. 20, 2017

(65) Prior Publication Data

US 2018/0093401 A1    Apr. 5, 2018

(30) Foreign Application Priority Data

Sep. 30, 2016  (CH) ...................... 1299/16

(51) Int. Cl.
| | | |
|---|---|---|
| B29C 45/14 | (2006.01) | |
| B65D 35/10 | (2006.01) | |
| B29L 23/20 | (2006.01) | |

(52) U.S. Cl.
CPC ........ B29C 45/14598 (2013.01); B65D 35/10 (2013.01); *B01L 2300/021* (2013.01); *B29C 2045/14852* (2013.01); *B29L 2023/20* (2013.01); *B65D 2203/10* (2013.01)

(58) Field of Classification Search
CPC .............................................. B29C 45/14598
USPC ......................................... 220/694; 174/520
See application file for complete search history.

(56) References Cited

U.S. PATENT DOCUMENTS

| | | | | |
|---|---|---|---|---|
| 2010/0032437 A1* | 2/2010 | Lossau | .................... | B01L 3/545 220/694 |
| 2012/0204991 A1* | 8/2012 | Quemeneur | ...... | B29C 45/14598 138/109 |
| 2014/0311615 A1* | 10/2014 | Banerjee | ................. | B32B 15/08 138/145 |
| 2016/0005948 A1* | 1/2016 | Hayashi | .................. | H01L 35/32 429/7 |
| 2016/0046087 A1* | 2/2016 | Jacobs | ................ | B29C 45/0001 264/235 |
| 2016/0327220 A1* | 11/2016 | Tischler | .............. | H01L 23/4985 |
| 2017/0069883 A1* | 3/2017 | Jarry | .................... | H01M 2/0207 |
| 2017/0181658 A1* | 6/2017 | Dettmann | ............ | A61B 5/0507 |
| 2017/0231738 A1* | 8/2017 | Severson | ................ | A61F 2/004 600/31 |
| 2018/0006287 A1* | 1/2018 | Schwartz | ............ | H01M 2/1673 |

FOREIGN PATENT DOCUMENTS

| | | |
|---|---|---|
| DE | 102011101260 | 10/2012 |
| EP | 0160536 | 11/1985 |
| EP | 2810637 | 12/2014 |
| WO | 0134488 | 5/2001 |
| WO | 2005097604 | 10/2005 |

\* cited by examiner

*Primary Examiner* — Timothy Thompson
*Assistant Examiner* — Charles Pizzuto
(74) *Attorney, Agent, or Firm* — Volpe and Koenig, P.C.

(57) ABSTRACT

The tube (1) has a multi-layered tube body (3), with a tube liner (19) enclosed by a seamless tube shell (21). An electronic device (17) having an energy store for the delivery of the requisite service voltage for operation is protectively arranged between the tube liner (19) and the tube shell (21), and is not visible from the exterior.

10 Claims, 1 Drawing Sheet

TUBE AND TUBE BODY WITH AN ELECTRONIC DEVICE

INCORPORATION BY REFERENCE

The following documents are incorporated herein by reference as if fully set forth: Swiss Patent Application No. 01299/16, filed Sep. 30, 2016.

BACKGROUND

The invention relates to a tube and a tube body having an electronic device, and also to a method for producing a tube body.

Tubes are generally employed for the storage and dispensing of liquid or pasty media in various fields of application. These include, specifically, the fields of foodstuffs, pharmaceuticals, medical technology and cosmetics.

Various parameters, including e.g. size, shape, materials and production techniques employed, the design of the tube body, the tube shoulder incorporating the tube opening and the stopper, specifically the incorporation of protective layers, form and function, decoration, imprints, information on contents etc. can be provided by the widest variety of means, in accordance with respective requirements.

In the case of products with a limited storage life and/or which can only be stored under certain environmental conditions, for example foodstuffs, medical, pharmaceutical or cosmetic products, the indication of corresponding information on the tube is important. For example, the printing of an expiry date or batch number on the outer side of the tube body, or the embossing thereof in the sealing seam at the lower end of the tube body, are therefore known. The space for such information, which is not applied until the filling of the tube, is generally very small. Consequently, only limited information can be applied to the tube in this manner.

Further information, including e.g. data on the contents of the tube, the storage or application thereof, or potential hazards, can be indicated, for example, on a visible outer decorative layer of the tube body. Here again, available space for this purpose is generally too small. Consequently, important information is customarily indicated on package leaflets. This is only possible if tubes are distributed with additional packaging. Moreover, package leaflets are frequently produced in multiple languages, with very small or barely legible print. Package leaflets can also be lost, if they are not kept together with the tubes.

Tubes customarily incorporate a tamper-evident seal which, upon the first opening of the stopper, is irreversibly destroyed or altered.

However, it is not possible for a user of the tube to detect whether this is an original seal, or a deceptively similar counterfeit. Likewise, it cannot be detected whether the tube has been correctly stored and/or transported.

For the manufacture of tubes, it is known for tube bodies to be formed from a sheet material, which comprises at least one layer of a plastic such as, e.g. polyethylene (PE) or polypropylene (PP). This sheet material can incorporate a barrier layer or sealing layer, for example a thin layer of electrically-conductive aluminum (Al), or of electrically non-conductive silicon oxide ($SiO_2$) or aluminum oxide ($Al_2O_3$), or an ethylene vinyl alcohol copolymer (EVOH). The barrier layer, for example on one side or on both sides, can be overlaid with one or more layers of plastic.

For the manufacture of tubes, the sheet material, generally in the form of a strip material, is played-out from a supply roll and formed into a flexible hose, wherein the abutting or mutually-overlapping longitudinal edges are bonded together, for example by welding or gluing, to form a leak-tight seam. The barrier layer prevents or minimizes the diffusion or penetration, specifically of oxygen and water vapor, through the sheet material. For the manufacture of a tube, a hose section of the desired length is bonded with a tube shoulder, for example by welding, gluing or molding-on, wherein the tube shoulder is produced as a molded component by injection-molding.

From DE 10 2011 101 260, a tube of this type is known, wherein the inner surface of the tube shoulder is also provided with a sealing layer. This sealing layer forms a leak-tight seal on the barrier layer of the tube body. The continuous application of the sealing layer to the entire inner surface of the tube shoulder can be executed e.g. by vapor deposition, sputtering, or electrical and/or chemical deposition, and is comparatively complex and expensive.

From DE 10 2011 101 260, the integration of a circuit having a RFID (radio frequency identification) function and an associated antenna structure into the multi-layered sheet material is moreover known. The production of sheet materials of this type is comparatively complex and intricate. High temperatures and compression forces, of the type associated with lamination can, for example, damage or destroy a chip, if the latter is not protected against damage in an appropriate manner. Alternatively, DE 10 2011 101 260 proposes that a circuit with RFID is fitted to the wall of the tube body, i.e. to the outer side thereof. The circuit is thus visible on the exterior of the tube and, moreover, cannot be protected against damage.

In this form of embodiment, none of the layers of the sheet material employed for the tube body can be electrically conductive, as the transmission of energy and/or information via the antenna of the RFID circuit would not otherwise function.

From US 2012/0204991 a further tube is known, in which a RFID component is integrated in the tube shoulder. The tube body can be molded onto the tube shoulder, e.g. in a subsequent injection-molding process. During the manufacture of the tube shoulder, the RFID circuit must be inserted in an injection mold, positioned and embedded in plastic. This is comparatively complex and expensive. High pressures and temperatures during the injection-molding process can destroy the chip and/or the associated antenna structures, or alter the position thereof in an uncontrolled manner. Moreover, the useful surface area of the tube shoulder is relatively small, and is also interrupted by the central outlet opening. Space restrictions hinder or prevent the fitting of such RFID circuits, particularly to small tubes. As energy transmission in circuits of this type is executed by passive transponders via the antennae thereof, there is a risk that, in the case of small antennae, insufficient energy can be transmitted for the operation of circuits and/or that sufficient energy can only be provided by very strong electromagnetic fields, or using electromagnetic sources which are arranged very close to the transponders. The dispenser neck incorporating the tube opening, and a cover which closes the tube opening, can impair energy transmission and communication with the write/read device. As tube shoulders or tube heads, even in tubes of equal external diameter, can be of widely varying design, transponders must be individually configured for the different forms of embodiment. This is both complex and expensive.

SUMMARY

One object of the present invention is therefore the creation of a tube which is simple to manufacture, having a protected and integrated electronic device. A further object of the invention is the configuration of the tube, such that information can be simply and reliably retrieved from the electronic device and/or can be transmitted to the electronic device. A further object of the invention is the creation of a tube body having an electronic device for such a tube.

A further object of the invention is the disclosure of a method for producing such a tube body.

These objects are fulfilled by a tube having one or more features of the invention, and also by a tube body and by a method for producing a tube body of this type. Advantageous further developments of this tube are disclosed below and in the claims.

The tube comprises a hose-type tube liner. This is preferably produced from a sheet material, which comprises at least one plastic layer. The sheet material can specifically be a multi-layered laminate incorporating one or more barrier layers, which are at least virtually impermeable to specific gases, such as e.g. oxygen and water vapor. A sealing layer of this type can incorporate e.g. aluminum or EVOH and, by a bonding agent, can be bonded on both sides with a polymer layer, specifically with a layer of polyethylene (PE) or polypropylene (PP).

For the manufacture of a tube liner of this type, two opposing longitudinal edges of the sheet material are welded or glued together in an overlapping or mutually abutting arrangement, such that a hose with a leak-tight longitudinal seam is formed. Alternatively, for the production of tube liners, extruded seamless hoses can be employed which, as required, can additionally be internally and/or externally coated with a sealing layer.

Both hoses produced from sheet material and extruded hoses for tube liners can be manufactured by a continuous process, in a known manner.

For the production of the tube bodies according to the invention, electronic devices are attached, generally at regular intervals, to the outer side of a hose of this type for the formation of a tube liner, for example flat RFID tags, wherein a transponder, comprising an antenna, specifically an antenna coil, and a chip, are preferably arranged on a self-adhesive plastic film as substrate. The mutual spacings of the electronic devices correspond to the length of the tube bodies to be manufactured, or the tube ends. Thereafter, a seamless outer cladding of a thermoplastic material is extruded onto the exterior of inner hose thus prepared. This outer cladding adheres to the inner hose, such that the electronic device is arranged or embedded in a protected manner between the inner hose and the cladding hose. By the cutting to length of the composite hose thus formed, tube bodies of the desired length are produced, in each of which an electronic device is arranged at a specific location between the ends of the hose sections.

The function of the antenna of the transponder is the contactless transmission of electromagnetic energy from an external apparatus to the electronic device, and thus the supply of power to said device and/or the unidirectional or bidirectional transmission of information between the electronic device and an external apparatus. The chip incorporates a storage medium or a memory, the storage capacity of which can be set in accordance with the respective requirements applied. This storage capacity can range from a few bytes up to several megabytes. At least part of the memory can be configured for the writing of information therein only once, such that this information cannot be deleted thereafter. In this region of the memory e.g. an identification code can be stored which, e.g. upon the filling of the tube by a dispensing apparatus, is transmitted to the electronic device of the tube. This identification code can comprise e.g. one or more sequences which clearly identify the tube contents and/or a batch number and/or the date of filling and/or an expiry date and/or the manufacturer. The protected integration of the electronic device in the tube body permits the largest possible margin of variation for design in the configuration and positioning of the electronic device on the tube. Thus, for example, a comparatively large space is available for antennae. Electronic systems, or elements thereof including e.g. antennae, operating components, indicator components, energy stores or a chip, can be optimally positioned in accordance with their respective function. Thus, for example, an antenna can be arranged in the vicinity of a position in which energy is fed-in from the exterior and/or information is to be transmitted. Optional indicator components can be arranged in positions in which they will not impair the visual appearance of the tube, but are nevertheless clearly visible. Any operating components, sensors and/or converters provided for the generation of electrical energy can likewise be optimally arranged in accordance with their function.

For the production of a tube, one end of a tube body, in a manner known per se, for example by welding or gluing, is bonded to a tube shoulder in a leak-tight arrangement.

Optionally, one or more electrically-conductive sections can be configured on the tube shoulder which, upon the connection thereof to the tube body, are bonded with corresponding electrically-conductive elements on the tube body in an electrically conductive manner. The latter elements, in turn, form part of the electronic device of the tube body. If two such electrically-conductive sections of the tube shoulder are electrically mutually bended by a tamper-evident seal, this can be determined by the electronic device of the tube body. The tamper-evident seal is configured such that, upon the first opening of the tube stopper, the electrically-conductive connection of the tamper-evident seal is interrupted, preferably in an irreversible manner. The electronic device detects the interruption of the connection, and can save corresponding information in a storage medium.

After the filling of the tube interior with the desired tube contents in a tube filling installation, via the still open lower end of the tube body, said lower end of the tube body is sealed in a known manner.

Before, during or after the filling of the tube, a memory of the transponder, in a write/read station, can be written with data which are relevant to the respective product. Such data can include, for example, one or more of the following items of information: a clear identification code, generated by the write/read station for each tube or each batch in a one-off or individual manner, manufacturer code, product code, date of manufacture, expiry date, product designation, product composition or contents, hazard warnings, instructions for use, or links to one or more websites containing further information. The storage medium of the electronic device, or part of this storage medium can be configured such that information stored therein, further to the initial writing thereof, cannot be deleted or overwritten. This has the advantage that such information cannot be manipulated subsequently. The storage medium, or part of the storage medium, can be configured for the encrypted storage of information.

Preferably, at least part of the storage medium is designed such that, further to the initial saving of information therein in conjunction with the filling of the tube, further data can be stored and retrieved. Such further data can, for example, be generated by the electronic device itself, and/or transmitted to the electronic device by an external apparatus. The electronic device can thus, for example, incorporate one or more integrated sensors for the detection of measured variables such as, for example, temperature or brightness. A processing unit of the electronic device can be configured, for example, for the detection of such measured variables in a periodic manner, or in accordance with other predefined criteria, and for the analog storage thereof in a data logger of the storage medium. Alternatively, for example, comparative values can be saved for one or more of the measured variables. If one of the measured variables exceeds or undershoots an associated comparative value, a corresponding element of information can be saved in the storage medium.

The electronic device is optimized for minimum energy consumption. It can incorporate elements whereby components can be switched-off, or can be set to a state of minimum energy consumption, if they are not in use. In order to ensure a sufficient energy supply, the electronic device can incorporate an energy store, for example a thin-film battery. Alternatively or additionally, the energy store can also incorporate a rechargeable capacitor for the purposes of energy storage. In a passive transponder, such a capacitor can, for example, store energy which is received from an electromagnetic energy source which is external to the tube via corresponding antennae of the transponder. Additionally or alternatively, the electronic device can also incorporate other elements whereby energy sourced from the exterior can be converted into electrical energy. One example of such elements are thin-film solar cells which, if they are overlaid with a transparent or opaque region of the tube shell, can convert light shining through the latter into electrical energy. A further example are piezoelectric films, which convert compressive and/or tensile forces exerted on the tube, or accelerations, of the type associated with the agitation of the tube, into electrical energy. If a person exerts external pressure upon the tube, or agitates the tube, sufficient energy can be generated to permit the display of information stored in the storage medium, for example the status of one or more status bits, using optional indicator(s) on the electronic device. Such indicators can comprise e.g. a membrane-type LED or a plurality of membrane-type LEDs of the same, or preferably of different colors.

Processing instructions for the monitoring of specific parameters, and for the setting or deleting of one or more status bits, are preferably saved in the storage medium of the electronic device. One status bit can be employed e.g. for the indication of unacceptable conditions. This status bit can be set, for example, if the temperature measured by an integrated temperature sensor exceeds or undershoots one or more predefined limiting temperatures. In an analogous manner, and in accordance with further measured variables, the same or another status bit can be set or deleted. Further measured variables can specifically include a temporal measured variable. The electronic device can, for example, incorporate a pulse generator, which delivers pulses to a counter or a timer, or an integrated clock with a date facility. In both cases, by the predefinition of a comparative value for the temporal measured variable, a time point can be predefined, for example an expiry date, in order to change the status of the status bit.

Preferably, the change of the status bit is irreversible. As a result, subsequent manipulations by unauthorized persons can be prevented.

For the indication of the status of the status bit(s), the electronic device can, in principle, employ the same elements that are also employed for the generation of electrical energy. As soon as energy is fed-in from the exterior and converted into electrical energy, the indicator device indicates the status of the status bit(s) wherein, for example, associated light-emitting diodes are transiently illuminated in red or green. Red indicates that at least one of the monitored parameters is critical, and that the intact quality of the tube contents cannot be guaranteed. Green signals that the tube contents are free of defects.

In further forms of embodiment, the electronic device can also incorporate a receiver, which is configured for the reception of external temporal and/or positional signals, for example a GPS receiver or a time signal receiver. With reference to the signals which are detected by such receivers, the electronic device can, for example, periodically execute a location check and document any changes observed, or save the respective location and time information in the storage medium. This permits the tracking of the respective product.

In tubes which have a freely-usable storage area in their storage medium, this storage medium can also be used for example to save customized data, e.g. data relating to a specific person. Specifically, for example, personal application data for a medical or cosmetic product can be stored in the memory. If the electronic device is designed for near-field communication (NFC) with a mobile telephone, the corresponding information can be displayed on the latter. In general, in the memory of the electronic device, a link can be saved for the opening of a specific app. Such apps can moreover be configured to deliver further information on the respective product wherein, for example, information is retrieved from corresponding databases via an Internet connection. Preferably, further information is used which is saved in the memory of the electronic device, for example data relating to the respective product, or to a specific person. In this way, the smartphone display can show the relevant contents in a targeted manner. The arrangement of elements of the electronic device according to the invention, or of elements of the electronic device functioning according to the invention, is not restricted to the integration thereof in the tube shell. Provided that production technology permits, such elements can also be arranged at other locations in the tube, for example in the tube shoulder.

BRIEF DESCRIPTION OF THE DRAWINGS

The invention is described in greater detail hereinafter, with reference to the figures. Here.

DETAILED DESCRIPTION OF THE PREFERRED EMBODIMENTS

Figure 1:
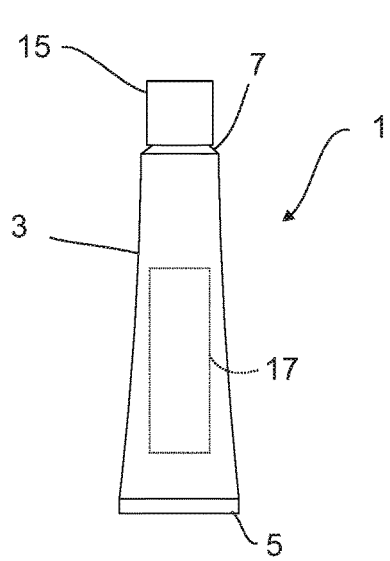
FIG. 1 shows a tube having an electronic device.

FIG. 1 shows a tube 1, comprising a flexible hose-type tube body 3, one end of which is closed by a sealing seam 5, and the opposing end of which is bonded with a tube shoulder 7 in a leak-tight arrangement.

Figure 2:
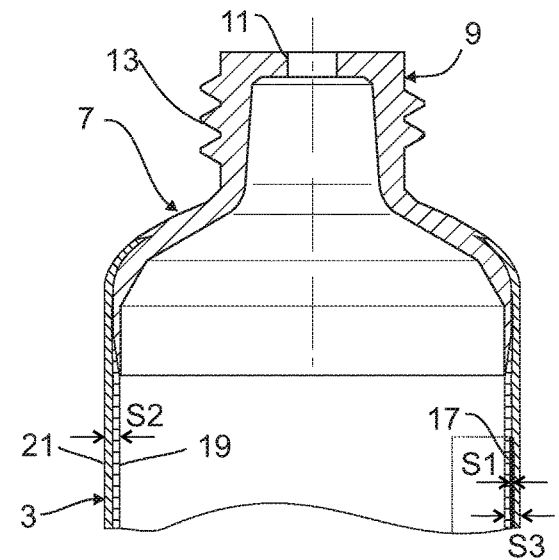
FIG. 2 shows a longitudinal section of a tube with no stopper, in the region of the tube shoulder.

FIG. 2 shows a longitudinal section of a tube 1 with the stopper cover 15 removed, in the region of the tube shoulder 7.

The tube shoulder 7 comprises a tube head 9 with a tube opening 11 and an external thread 13. In the representation of the tube shown in FIG. 1, the latter are not visible, as a threaded tube stopper 15 of the tube for the closure of the tube opening 11 is threaded onto the tube head 9. A thin electronic device 17, which is integrated in the tube body 3, is schematically represented in FIG. 1 by a dotted line.

The electronic device 17 is preferably arranged on a flexible substrate, for example on a self-adhesive plastic film or a plastic film incorporating a bonding layer. During the manufacture of the tube body 3, this is adhered onto a hose-type tube liner 19, and is thereafter embedded in the tube body 3 by the extrusion thereupon of a seamless outer tube shell 21 of a plastic material. The tube shell 21 can be formed of plastic which is non-transparent, or as least locally overlaid with a non-transparent layer, for example a color layer of an imprint, such that the internally-embedded electronic device 17, or elements thereof, are not visible from the exterior. Optionally, the tube shell 21, or sections of the tube shell 21, can be configured as opaque or transparent, in an analogous manner. This is advantageous, if the electronic device 17 incorporates light-emitting or light-absorbing elements such as, e.g. light-emitting diodes or thin-film solar cells (not represented).

Preferably, the substrate of the electronic device 17 has properties which, for the recycling of the tube 1, facilitate the separation of the electronic device 17 from the surrounding material. Such properties include, for example, a higher melting point or increased toughness thereof, in comparison with that of the adjoining materials of the tube shell 21 and the tube liner 19. Specifically, the components of the electronic device 17 can be at least partially embedded in such a substrate. The thickness 51 of the electronic device 17 is preferably smaller than the thickness S2 of the tube body 3, at points of the tube body 3 not directly adjoining the electronic device 17. In the region of the electronic device 17, the maximum overall thickness S3 of the tube body 3 is preferably of equal size, or only slightly greater, i.e. less than 20% greater than the thickness S2 of adjoining regions of the tube body 3. Consequently, to the eye, it is barely perceptible than an object is embedded in the tube body 3.

Figure 3:
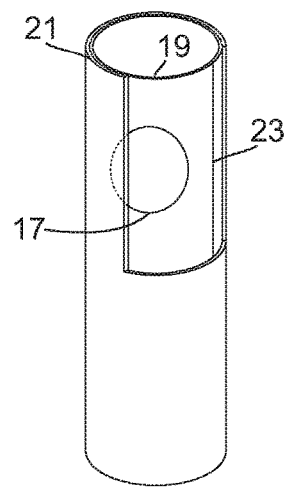
FIG. 3 shows a section of a partially cut-away hose for the manufacture of a tube body.

FIG. 3 shows a tube body 3, in which a section of the tube shell 21 has been cut away, such that regions of the electronic device 17 and the tube liner 19 which are covered by the tube shell 21 are visible. The electronic device 17, as in the example represented in FIG. 3, can be a circular RFID tag.

Preferably, the tube liner 19, analogously to the tube bodies of conventional laminate tubes, is formed from a multi-layered sheet structure, wherein two opposing edges of said sheet structure are mutually bonded along a longitudinal seam 23. Specifically, this permits tube bodies 3 and tubes 1 according to the invention to be provided with a barrier layer.

Figure 4:
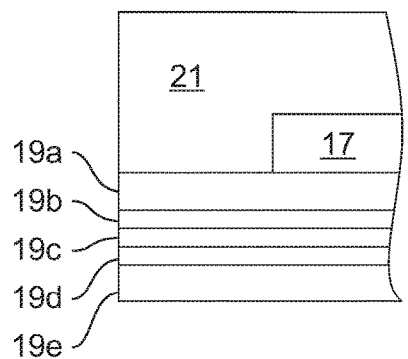
FIG. 4 shows the laminar structure of a tube shell.

FIG. 4 shows an example of a potential laminar structure of a tube body 3 of a tube 1 of this type. The overall thickness of the tube is smaller than 1 mm, and preferably smaller than 0.6 mm, for example 0.5 mm, or 0.35 mm, or 0.3 mm. The tube shell 21 is produced, for example, from polypropylene (PP). The thickness thereof preferably lies within the range of one-quarter to three-quarters of the overall thickness of the tube body 3. The tube liner 19, adjacently to the tube shell 21 and adjacently to the tube interior, respectively incorporates a plastic layer 19a, 19e which, for example, are likewise formed of polypropylene, and have a smaller thickness than that of the tube shell 21. Between these plastic layers 19a, 19e, a barrier layer 19c is arranged which is comprised, for example, of aluminum, and preferably has a thickness of between 10 and 50 micrometers, for example 12, 15 or 40 micrometers. The barrier layer 19c is bonded on both sides to the two outer plastic layers 19a, 19e of the tube inner shell 19, by one layer 19b, 19d respectively of a bonding agent. The layer thicknesses of the bonding agent are of a similar order of magnitude to the thickness of the barrier layer 19c.

Alternatively, the tube liner 19 can also incorporate other materials and/or layer thicknesses. If the barrier layer 19c comprises an electrically conductive material, a localized recess can be incorporated in this barrier layer 19c, which is arranged in the region of an antenna of the electronic device 17. By this arrangement, the transmission of energy and/or information between the electronic device 17 and an external apparatus can be improved.

The invention claimed is:

1. A tube (1) comprising an electronic device (17), a tube body (3) and a tube shoulder (7) which is bonded to the tube body (3), the tube shoulder delimits a tube opening (11) and, in combination with the tube body (3), delimits a tube interior, the tube body (3) comprises a hose-type tube liner (19) that is enclosed by a seamless tube shell (21) formed as an extruded hose, the electronic device (17) incorporates an energy store for delivery of a service voltage for operation, and the electronic device (17) is arranged between the tube liner (19) and the tube shell (21).

2. The tube (1) according to claim 1, wherein the tube liner (19) is formed of a multi-layered flexible sheet material, which is molded to form a hose-type structure, and the multi-layered flexible sheet material includes mutually abutting or overlapping edges that are mutually bonded along a longitudinal seam (23).

3. The tube (1) according to claim 2, wherein the multi-layered flexible sheet material from which the tube liner (19) is formed comprises a laminate that incorporates a barrier layer (19c) of aluminum or plastic.

4. The tube (1) according to claim 1, wherein the electronic device (17) incorporates a transponder and a storage medium.

5. The tube (1) according to claim 1, wherein the energy store comprises at least one of a rechargeable capacitor or a thin-film battery.

6. The tube (1) according to claim 1, wherein the electronic device (17) incorporates an energy converter configured for conversion of energy fed-in from an exterior into electrical energy which is usable by the electronic device (17).

7. The tube (1) according to claim 1, wherein the electronic device (17) comprises one or more of the following elements:
   a) a RFID tag,
   b) a thin-film battery,
   c) a capacitive element for the storage of electrical energy,
   d) a GPS receiver,
   e) a radio time receiver,
   f) a temperature sensor,
   g) a brightness sensor,
   h) a storage medium having a non-deletable or read-only storage facility,
   i) a storage facility in which data can be saved in a deletable or overwritable format, or
   j) an indicator.

8. The tube (1) according to claim 1, wherein the electronic device (17) comprises two electrically conductive elements, which are mutually bonded by an electrical bonding conductor which is arranged on the tube shoulder (7) and is interruptible by an element of a tamper-evident seat.

9. A tube body (3) for producing a tube (1), the tube body comprising a hose-type tube liner (19) enclosed by a seamless tube shell (21) formed as an extruded hose, and an electronic device (17) having an energy store for delivery of a service voltage for operation arranged between the tube liner (19) and the tube shell (21).

10. A method for producing the tube body (3) according to claim 9, the method comprising:
   producing an inner hose comprised of least one plastic layer (19, 19*a*),
   forming a sheet material incorporating the at least one plastic layer (19, 1*a*) into a curve, and
   mutual bonding of two longitudinal edges of said sheet material along a longitudinal seam (23), or extruding a thermoplastic mass, arranging on and outer side of said inner hose,
   extruding an outer cladding hose onto said inner hose having the electronic device (17) to form a composite hose, and
   cutting the composite hose to length according to a required length of the tube body (3).

\* \* \* \* \*